June 15, 1943.   S. A. COHEN ET AL   2,321,996
LINOLEUM
Filed May 26, 1942     2 Sheets-Sheet 1
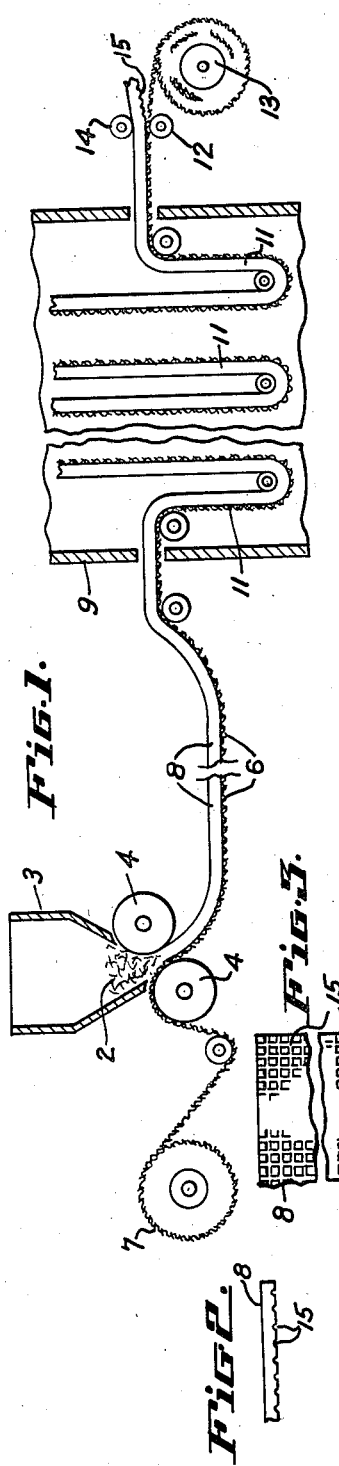
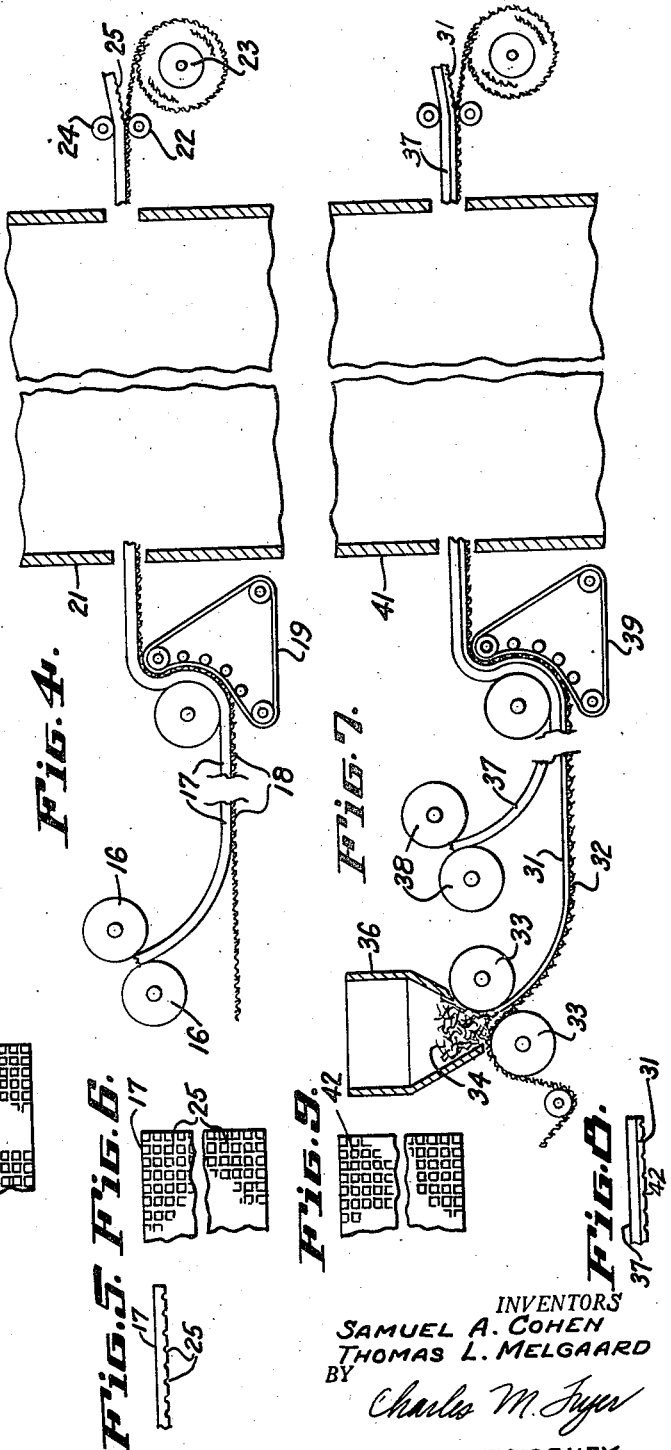
INVENTORS
SAMUEL A. COHEN
THOMAS L. MELGAARD
BY
Charles M. Fryer
ATTORNEY.

June 15, 1943.   S. A. COHEN ET AL   2,321,996
LINOLEUM
Filed May 26, 1942   2 Sheets-Sheet 2
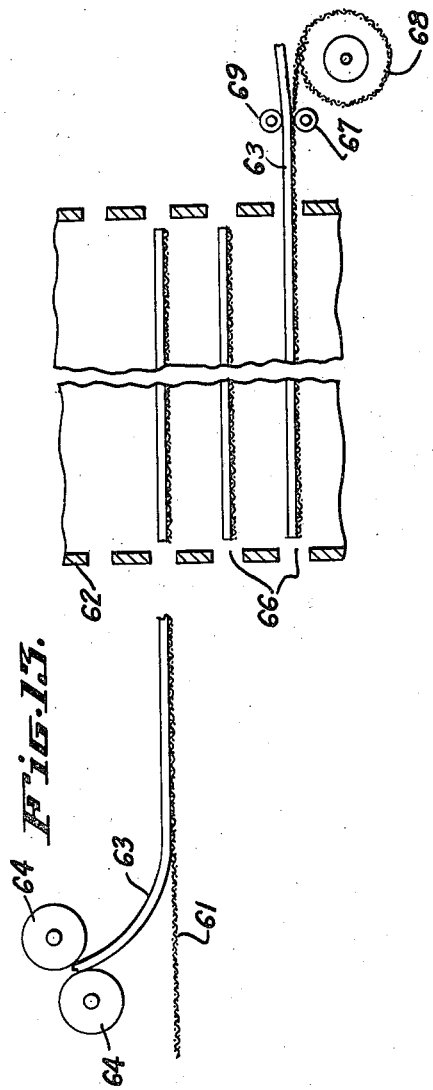
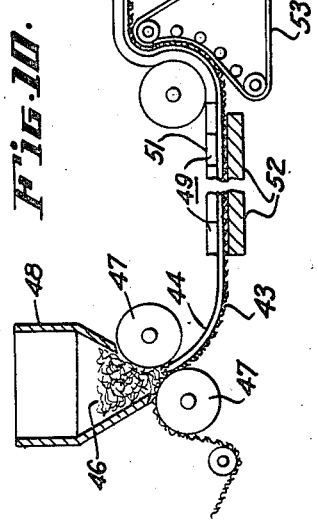
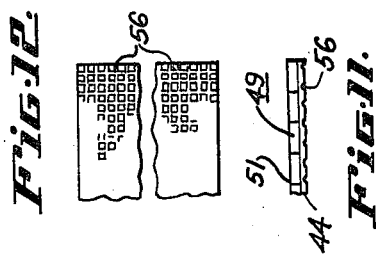
INVENTORS.
SAMUEL A. COHEN
THOMAS L. MELGAARD
BY
Charles M. Fryer
ATTORNEY.

Patented June 15, 1943

2,321,996

UNITED STATES PATENT OFFICE 2,321,996

LINOLEUM

Samuel A. Cohen and Thomas L. Melgaard, Berkeley, Calif., assignors to The Paraffine Companies, Inc., San Francisco, Calif., a corporation of Delaware Application May 26, 1942, Serial No. 444,522

3 Claims. (Cl. 154—25)

Our invention relates to the manufacture of linoleum, and more particularly to conservation of a supporting backing employed in such manufacture.

Although there are various forms of sheet linoleum, all commercial forms are essentially the same, in that they include a supporting or reenforcing backing to which is adhesively united a linoleum mix deposited in an uncured state, either in granular or sheet form. The uncured mix is united to the backing by pressing or calendering; and then the resultant sheet is subjected to a slow heat treatment which effects curing of the mix, and a relatively strong adhesive bond with the backing. During deposit of the mix on the backing, the backing is in the form of a continuous sheet, so that the resultant sheet is also continuous; and in curing, the resultant continuous sheet of linoleum is conducted at a relatively slow rate through a long curing or drying room.

To conserve space, the linoleum is vertically suspended in the curing room in relatively long loops, by suitable festooning apparatus; each side of a loop being about thirty (30) to fifty (50) feet in length. The width of the linoleum sheet is generally about six (6) feet; and after the curing, the continuous sheet of linoleum upon leaving the curing room, is usually cut up into sheets which are about forty-five (45) to one hundred (100) feet in length.

The backing is particularly necessary for reenforcing the uncured linoleum mix thereon as it is conducted in loops through the curing room, because the uncured mix has insufficient strength to support itself vertically without tearing. Heretofore, the trade has believed the backing essential for imparting sufficient strength to the cured linoleum when cut up in the relatively large sheets mentioned above, to permit handling of such sheets and provide strength during laying thereof. Burlap is the material generally employed as the backing; and this material is gradually becoming unavailable to the industry, thus presenting a considerable problem.

Our invention has as its objects conservation of the backing, and the provision of sheet linoleum without a backing which results in the linoleum having improved physical properties. Other objects of our invention will become apparent from a perusal of the following description thereof.

We have found that although the backing is necessary during the process of manufacture of the linoleum, it can be readily removed or peeled off the cured sheet of linoleum upon leaving the curing room, and reused again either in the manufacture of linoleum or for any other desired purpose. Contrary to generally accepted belief in the industry, we have also found that removal of the backing from the cured linoleum sheet does not injuriously weaken the sheet. Therefore, the sheet may be handled and utilized in generally accepted sizes.

Furthermore, removal of the backing results in desirable physical properties. The linoleum sheet without the backing may be cut into desired shapes more readily than it can with the backing adhesively secured thereto, inasmuch as the backing offers more resistance to cutting than the cured linoleum mix. Also, in laying sheet linoleum, particularly when the linoleum is being coved along its edges, it is necessary to bend the linoleum upwardly with respect to its undersurface, namely, the backing surface; and the backing offers resistance to such bending. Consequently, linoleum with a backing cannot be bent as readily upwardly with respect to its undersurface as it can be bent downwardly. Without the backing, the sheet linoleum is just as flexible in bending upwardly as in bending downwardly with respect to its undersurface which facilitates laying of the linoleum. When linoleum with the usual fabric backing is secured to a foundation surface by the usual liquid linoleum cement or paste, allowance must be made for shrinkage of the fabric. With the backing removed, substantially no shrinkage will occur; and this also facilitates laying of the linoleum.

The drawings illustrate schematically various methods for the manufacture of linoleum wherein a supporting backing is employed, and is subsequently removed. In such drawings:

Fig. 1 is a schematic view of a conventional method wherein granular linoleum mix is calendered on a supporting backing.

Fig. 2 is a fragmentary edge view of the resulting article with the backing removed.

Fig. 3 is a plan view of the article looking at its undersurface; portions being omitted from the view to shorten it.

Fig. 4 is a schematic view of a conventional method wherein uncured sheeted linoleum mix is deposited directly on a backing, and pressed thereon before curing.

Fig. 5 is a fragmentary edge view of the resulting article with the backing removed.

Fig. 6 is a plan view of the article looking at its undersurface; portions being omitted from the view to shorten it.

Fig. 7 is a schematic view of a variation of the method illustrated by Fig. 4, wherein a relatively thin layer of uncured granular linoleum mix is first calendered on the backing to provide a bedding layer or coating.

Fig. 8 is a fragmentary edge view of the resulting article with the backing removed.

Fig. 9 is a plan view of the article looking at its undersurface; portions being omitted from the view to shorten it.

Fig. 10 is a schematic view illustrating our preferred method for the manufacture of so-called inlaid linoleum, to facilitate removal of the backing.

Fig. 11 is a fragmentary edge view of the resulting article with the backing removed.

Fig. 12 is a plan view of the article looking at its undersurface; portions being omitted from the view to shorten it.

Fig. 13 is a schematic view illustrating a method for manufacturing unbacked linoleum, wherein the linoleum mix need not be pressed or calendered to the backing prior to curing of the resultant sheet.

With reference to Fig. 1, any suitable uncured, hot linoleum mix 2 in granular form is supplied continuously from hopper 3 between conventional heated calender rolls 4 and onto a continuous backing sheet 6, fed between calender rolls 4 from a roll 7 thereof. Usually, hopper 3 is at the end of a shuttle conveyer (not shown) which moves back and forth so as to distribute mix 2 uniformly between the rolls 4. As is well known to the trade, the linoleum mix generally comprises a suitable pigment to impart the desired color; a filler which may include ground cork, granular mineral matter and wood flour; and linoleum cement generally comprising a mixture of drying oil, resin and a suitable drier, which mixture may be first air-blown for a suitable length of time until it reaches the desired viscosity.

Calender rolls 4 calender the mix onto backing 6; so that when the backing and the mix leave such rolls, it comprises an integral wear layer 8 of the uncured mix adhesively united to the backing. After calendering, the resultant sheet comprising layer 8 and backing 6 is fed into curing room 9, which is maintained at suitable temperatures for curing of the linoleum layer 8; suitable conventional supporting means (not shown) being provided for the linoleum, between the calender rolls and the curing room.

Curing room 9 is usually of considerable length, and contains any suitable festooning apparatus which conducts the linoleum sheet through the drying room in relatively long loops 11, each side of which may run anywhere from thirty (30) to fifty (50) feet. Backing 6 provides the necessary reenforcement for supporting the uncured linoleum in the long loops. After leaving curing room 9, we have found that backing 6 may be readily removed from the linoleum by peeling it off, which may be readily accomplished by guiding the backing in one direction over a guide roll 12 to a suitable winding roll 13, and the cured linoleum layer 8 in another direction over guide roll 14. Such cured linoleum wear layer 8 is usually cut into relatively long sheets, after leaving the curing room.

The conserved backing 6 may be utilized again in the manufacture of linoleum; or it may be used for other purposes, such as for the manufacture of sacks if the backing is of fabric. In this connection, the trade has generally demanded burlap for the backing to provide the reenforcement which it believed the finished article required. Since we have found that such reenforcement is not required in the finished article, it is apparent that our invention opens up a field for other materials that may be employed as a backing to support the linoleum through the stage of being cured. For example, cotton or canvas may be utilized, or even wire mesh.

To facilitate peeling off or removal of the backing, it may be first treated with any suitable agent adapted to lessen the adhesive bond between the backing and the linoleum mix thereon. For example, wax, oil, dusting powder or talc may be employed for this purpose. In this connection, some of the material in the linoleum mix, such as resin and driers such as manganese resinate, have been employed in excess quantiy to enhance the bond between the linoleum mix and the backing. The method of our invention enables reduction in the quantities of such materials.

As can be noted from Fig. 3, the finished article with the backing removed can be readily identified because it will have markings 15 on its undersurface resulting from imprint of the backing mesh. As was previously related, the finished article will cut easier; will be just as flexible in bending upwardly as downwardly with respect to its undersurface; and can be cemented to a foundation surface with substantially no shrinkage of its undersurface.

Fig. 4 illustrates another conventional method for manufacturing linoleum, wherein uncured linoleum mix in sheet form is deposited on a backing. Such method is generally utilized for the manufacture of so-called marble-effect linoleum. In the manufacture of the sheeted linoleum mix, a granular linoleum mix of any suitable character is run through various groups of calender rolls which form sheets thereof; and from the last of such rolls 16, it is deposited as an uncured sheet 17 on backing 18 supplied from a suitable roll in the manner described with reference to Fig. 1. The resultant sheet, comprising backing 18 and the wear layer sheet 17 of uncured linoleum mix thereon, is conducted over suitable supporting means (not shown), to heated presser mechanism 19 of any conventional construction which adhesively unites layer 17 to the backing. From the presser 19, the resultant sheet is fed into curing room 21 wherein it is handled in the same way described with respect to Fig. 1. After leaving the curing room, backing 18 is peeled off the linoleum by being guided in one direction over guide roll 22 to a suitable winding roll 23; and the sheet 17 of cured linoleum is guided in another direction over another guide roll 24.

The finished article, which after leaving the curing room is cut into long sheets, will have markings 25 on its undersurface resulting from removal of the backing. What has been already said with respect to the improved properties of the article made by the method of Fig. 1, the employment of an agent to lessen adhesive bond between the backing and the linoleum mix, reduction in the quantities of materials heretofore employed to insure a strong adhesive union between the linoleum mix and the backing, and the character of backing which may be employed, applies to the article resulting from the method of Fig. 4, as well as to the articles resulting from the methods of Figs. 7 and 10, to be subsequently described.

In some cases, the backing may be peeled off easier from the linoleum if it is adhesively united to a bedding coating or layer formed of calendered granular linoleum mix employed in the method of Fig. 1, instead of the sheeted linoleum mix disclosed in the method of Fig. 4. Fig. 7 discloses a method, wherein a relatively thin bedding coating or layer 31 of linoleum mix is formed on backing 32 from granular linoleum mix, to facilitate peeling off of the backing. As in the method of Fig. 1, layer 31 is formed by heated calender rolls 33 between which heated granular linoleum mix 34 is fed from hopper 36.

Upon this bedding coating is deposited a wear layer 37 of sheeted linoleum mix supplied from calender rolls 38 in the manner explained with respect to Fig. 4. Uncured layers 31 and 37 are adhesively united to each other by conventional heated presser 39; and from the presser the resultant sheet is fed into curing room 41 of the type referred to in connection with Fig. 1. After leaving the curing room, the backing is peeled off of the linoleum in the manner already described, and then cut into relatively long sheets which will have markings 42 on the undersurface, resulting from removal of the backing.

Fig. 10 illustrates a preferred method of our invention applicable to so-called inlaid linoleum. In the method for making inlaid linoleum now commercially employed by the trade, it is usual to impregnate the fabric backing beforehand with an adhesive linoleum mix, to prevent the mesh of the fabric from showing through the individual designs which are deposited on the backing. This adhesive mix when cured renders it rather difficult to peel off the backing. Therefore, in our preferred procedure, when applied to the manufacture of inlaid linoleum, we preferably form on backing 43 a relatively thin bedding coating or layer 44 of uncured linoleum mix of the type referred to in the method of Fig. 7, to facilitate peeling off of the backing.

As in the method of Fig. 7, such mix in heated, granular form 46 is adhesively united to backing 43 by calender rolls 47 between which it is fed from hopper 48. Wear layer 49 is formed on bedding layer 44, in the usual manner, by depositing individual designs 51 of material laid to form a predetermined design or pattern; such individual designs being either in the form of so-called individual tile elements or in the form of various granular mixes deposited through suitable templets. Laying of the individual designs of material is effected over suitable supporting means 52, over which the backing 43 passes with bedding coating 44 thereon. The resultant sheet is then passed through heated presser 53 which adhesively unites wear layer 49 to bedding layer 44, and from which it travels into curing room 54 of the type described with respect to Fig. 1. After leaving the curing room, backing 43 is peeled off of the linoleum in the manner already related; and the linoleum is then cut into sheets of desired length, which will have markings 56 on the undersurface, resulting from removal of the backing.

Under some circumstances, the bedding coating 44 may be eliminated; and the individual wear layer designs 51 of material deposited directly on backing 43. When thus deposited, the resultant sheet may be passed through heated presser 53 which will adhesively unite the designs to backing 43. After leaving the presser, such sheet may be then treated in the manner related with respect to Fig. 10; and after curing, the backing may be peeled off in the manner previously described.

In the previously described methods where the uncured linoleum is cured in a room through which it is conducted in vertically suspended loops by suitable festooning apparatus, the backing should be adhesively united to the uncured linoleum mix in order to provide support therefor. However, where a special curing room is provided enabling the linoleum to be passed therethrough while supported horizontally, the linoleum mix need not be adhesively united to the backing by calendering or pressing. Fig. 13 illustrates such method wherein backing 61 is fed toward curing room 62. Upon backing 61 is deposited a sheet 63 of uncured linoleum mix supplied from calender rolls 64 in the manner described with respect to Fig. 4.

Sheeted linoleum mix 63 need not be adhesively secured to backing 61 because such backing will provide all the support required when carrying the linoleum horizontally. Curing room 62 is relatively long, and contains suitable mechanism therein for conducting tiers of the linoleum in a horizontal direction to cure the same. Vertically arranged openings 66 may be provided in the front wall of room 62 to enable the resultant sheet comprising backing 61 and sheet 63 thereon, to be fed into the room at various levels. As one tier becomes full, the resultant sheet may be cut and fed to the next upper tier. From each tier backing 61 may be readily removed by passing it in one direction over a suitable guide roll 67 to a winding roll 68; the cured linoleum sheet 63 being directed in another direction over guide roll 69. The removing mechanism may be arranged so that it can be moved from tier to tier as it is desired to remove the backing.

The various cut sheets of removed backing may be spliced together again, and utilized in a single roll for the manufacture of linoleum. Backing 61 is preferably of metal mesh, but may be of any other suitable material if so desired. As with respect to the previously described methods, the linoleum sheet 63 may be cut into standard lengths, which will have the improved physical properties already described. Since backing 61 is not adhesively united to the sheeted linoleum mix supported thereon, there is no occassion to treat it with an agent for facilitating peeling off of the backing.

From the preceding description, it is seen that the method of my invention not only results in an improved product for the reasons presented above, but also serves to conserve the backing, as it may be used over again in the manufacture of linoleum, or, if not suitable for this purpose, it may be employed in the manufacture of sacks or other similar articles.

In the art, it is customary with linoleum having a relatively thick layer of linoleum mix on a backing of the character described in connection with the method of Fig. 1, to cut various colors of such linoleum into tile elements of relatively small shape when it is desired to lay the linoleum for forming a so-called tile design. The fabric backing is usually ripped off of each element thus cut, so that the backing will not show through the cracks formed between adjacent tile elements and thus improve the appearance of the joints between such elements.

Howver, the backing was destroyed and not conserved. Furthermore, during handling of the linoleum in sheet form, and prior to cutting of the linoleum on the job, it was thought necessary to have the backing secured adhesively thereto in order to provide sufficient reenforcement for the sheet. Therefore, the procedure of removing the backing from small shapes of linoleum, provides no recognition that sheet linoleum can be satisfactorily made as an article of manufacture without the supporting backing therefor, and that such backing may be used again.

We claim:

1. The method of manufacturing linoleum with a supporting backing in a manner enabling the backing to be readily removed for reuse, which comprises applying to the backing a bedding coating of linoleum mix, adhesively uniting the mix to the backing, applying a wear layer of linoleum over the bedding coating, curing the resultant sheet, and after the curing peeling off the backing for reuse.

2. The method of manufacturing linoleum with a supporting backing in a manner enabling the backing to be readily removed for reuse, which comprises applying to the backing a relatively thin bedding coating of linoleum mix, adhesively uniting the mix to the backing by calendering, applying a wear layer of linoleum over the bedding coating, adhesively uniting such wear layer to the bedding coating by pressing, curing the resultant sheet, and after the curing peeling off the backing for reuse.

3. The method of manufacturing inlaid linoleum with a supporting backing in a manner enabling the backing to be readily removed for reuse, which comprises applying to the backing a relatively thin bedding coating of linoleum mix, adhesively uniting the mix to the backing by calendering, applying individual designs of material over the bedding coating to form a wear layer having a predetermined design, adhesively uniting such wear layer by pressing, curing the resultant sheet, and after the curing peeling off the backing for reuse.

SAMUEL A. COHEN.
THOMAS L. MELGAARD.